United States Patent
Kim et al.

(10) Patent No.: US 10,557,672 B2
(45) Date of Patent: Feb. 11, 2020

(54) HEAT TRANSFER TUBE HAVING RARE-EARTH OXIDE SUPERHYDROPHOBIC SURFACE AND METHOD FOR MANUFACTURING THE SAME

(71) Applicant: DOOSAN HEAVY INDUSTRIES & CONSTRUCTION CO., LTD, Changwon-si, Gyeongsangnam-do (KR)

(72) Inventors: Hyun Sik Kim, Seoul (KR); Hyun Gee Kim, Yongin-si (KR); Jin Bum Kim, Yongin-si (KR); Young Suk Nam, Yongin-si (KR); Jae Hwan Shim, Yongin-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 195 days.

(21) Appl. No.: 15/710,573

(22) Filed: Sep. 20, 2017

(65) Prior Publication Data
US 2018/0135927 A1    May 17, 2018

(30) Foreign Application Priority Data
Nov. 14, 2016    (KR) .................... 10-2016-0151124

(51) Int. Cl.
*F28F 19/02*    (2006.01)
*C01F 17/00*    (2006.01)
*B05D 1/18*    (2006.01)

(52) U.S. Cl.
CPC .......... *F28F 19/02* (2013.01); *C01F 17/0043* (2013.01); *B05D 1/18* (2013.01); *F28F 2245/04* (2013.01)

(58) Field of Classification Search
None
See application file for complete search history.

(56) References Cited

U.S. PATENT DOCUMENTS

| | | | |
|---|---|---|---|
| 2003/0114298 A1* | 6/2003 | Woodhead | A24D 1/02 502/302 |
| 2006/0113007 A1* | 6/2006 | Morris | C09D 5/086 148/273 |
| 2015/0246819 A1* | 9/2015 | Brichka | C01B 33/26 428/328 |

FOREIGN PATENT DOCUMENTS

KR    101479448    * 1/2015

* cited by examiner

*Primary Examiner* — Nathan T Leong
(74) *Attorney, Agent, or Firm* — Invenstone Patent, LLC

(57) ABSTRACT

The present disclosure relates to a heat transfer tube having rare-earth oxide deposited on a surface thereof and a method for manufacturing the same, in which the rare-earth oxide can be deposited on the surface of the heat transfer tube to implement a superhydrophobic surface even under the high temperature environment and a plurality of assembled heat transfer tubes can be coated by coating a complex shape by depositing rare-earth oxide using a method for dipping a surface of the heat transfer tube and coating the same, thereby reducing or preventing the heat transfer tubes from being damaged during the assembling of the heat transfer tubes after the coating.

16 Claims, 20 Drawing Sheets

[Fig 1]
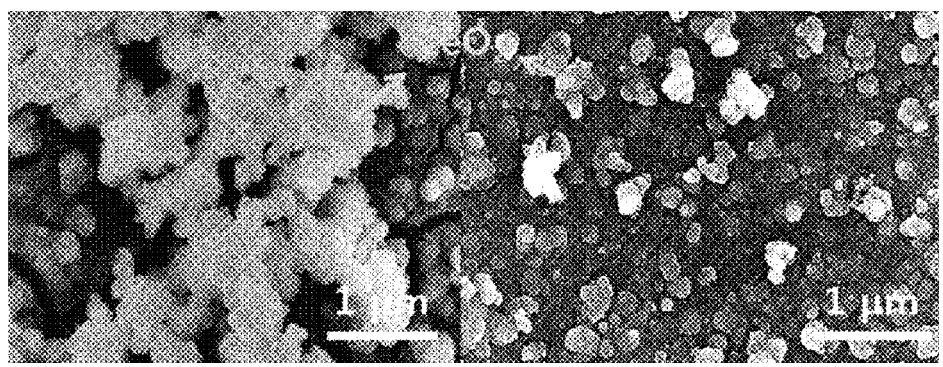
[Fig 2]
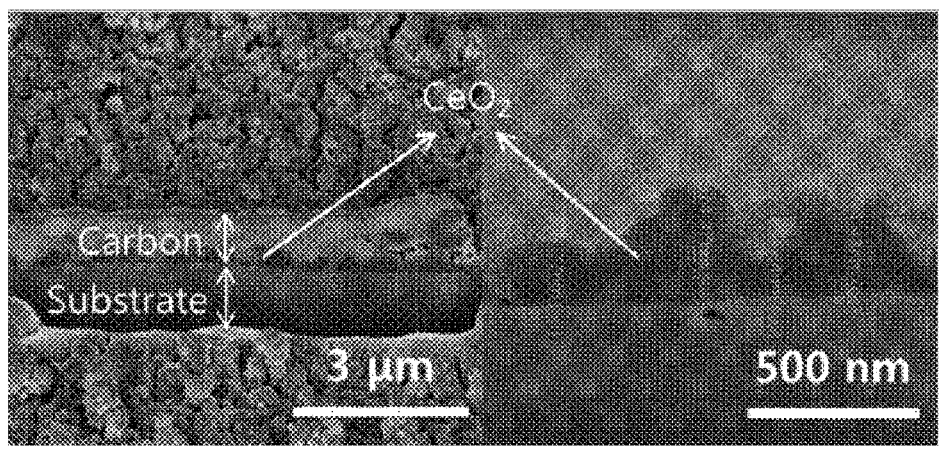

[Fig 3]
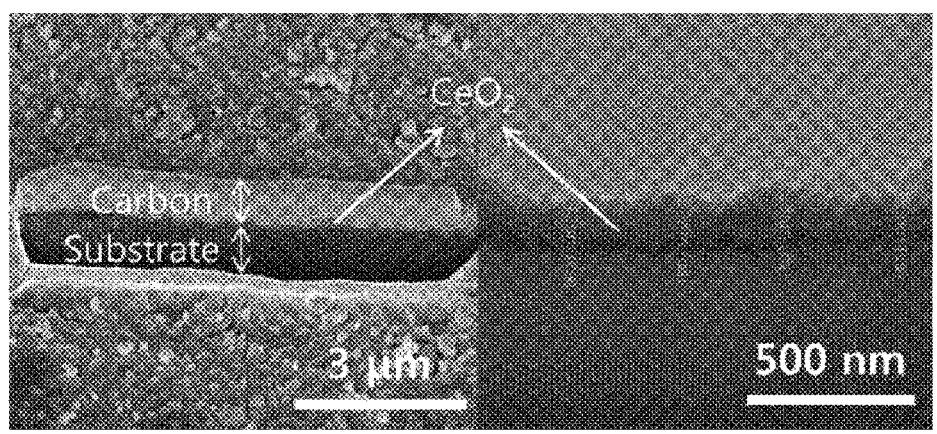

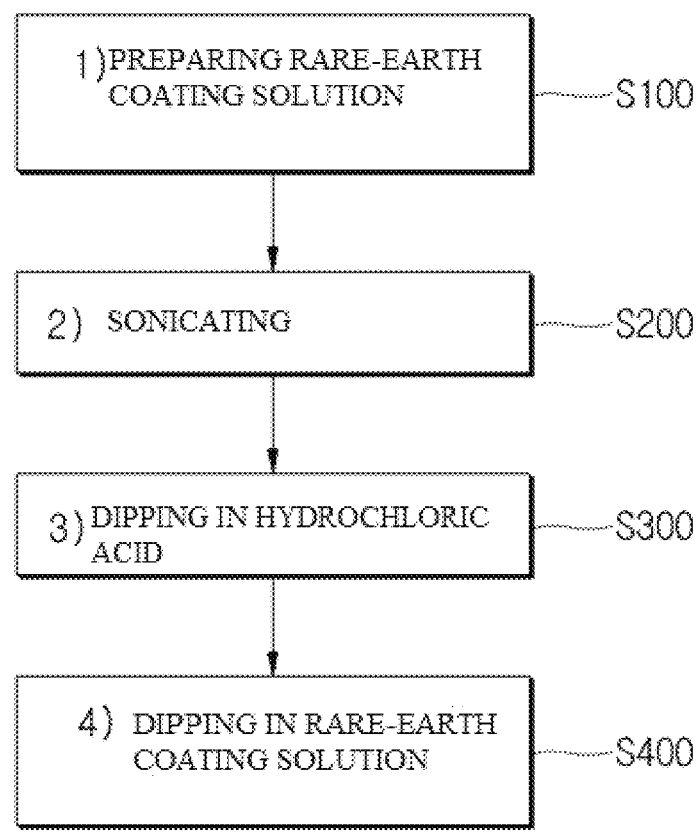
[Fig 4]

[Fig 5]
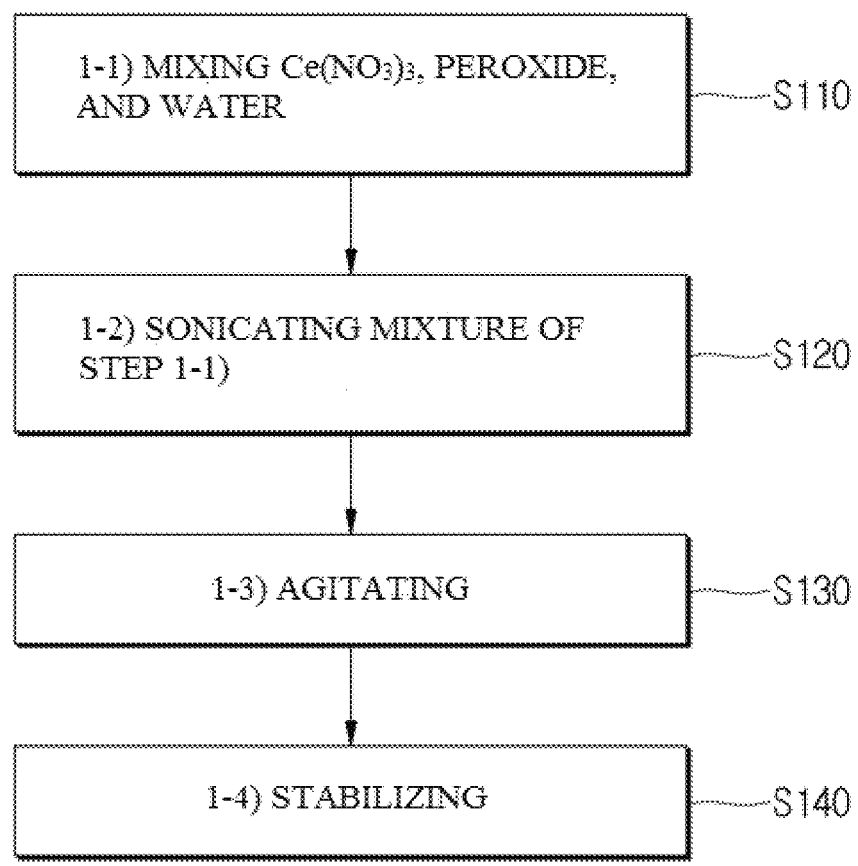

[Fig 6]
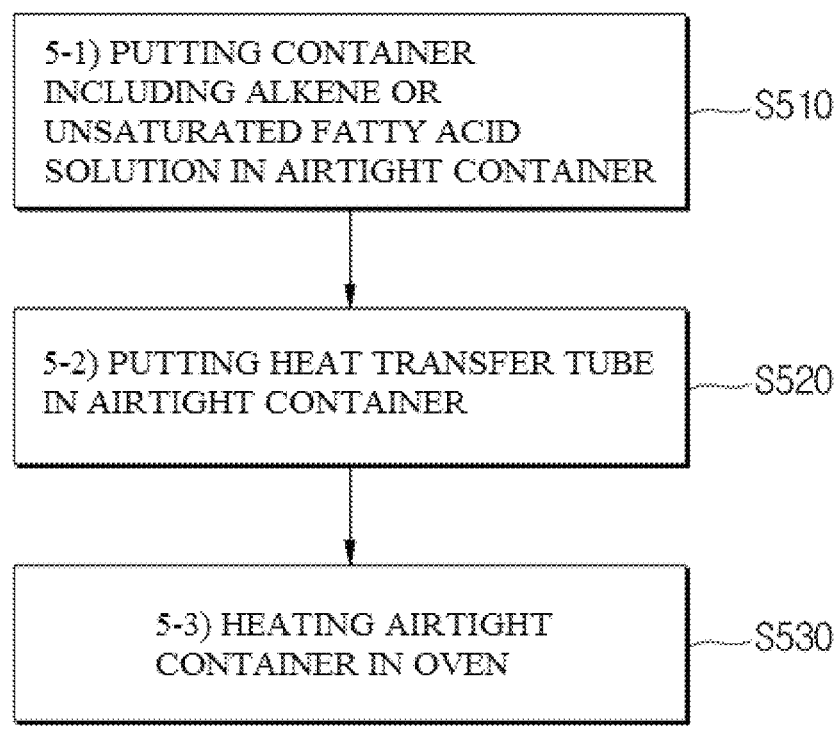
[Fig 7]
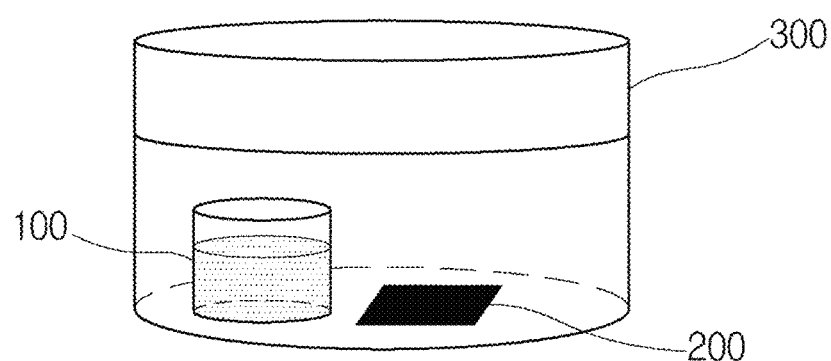

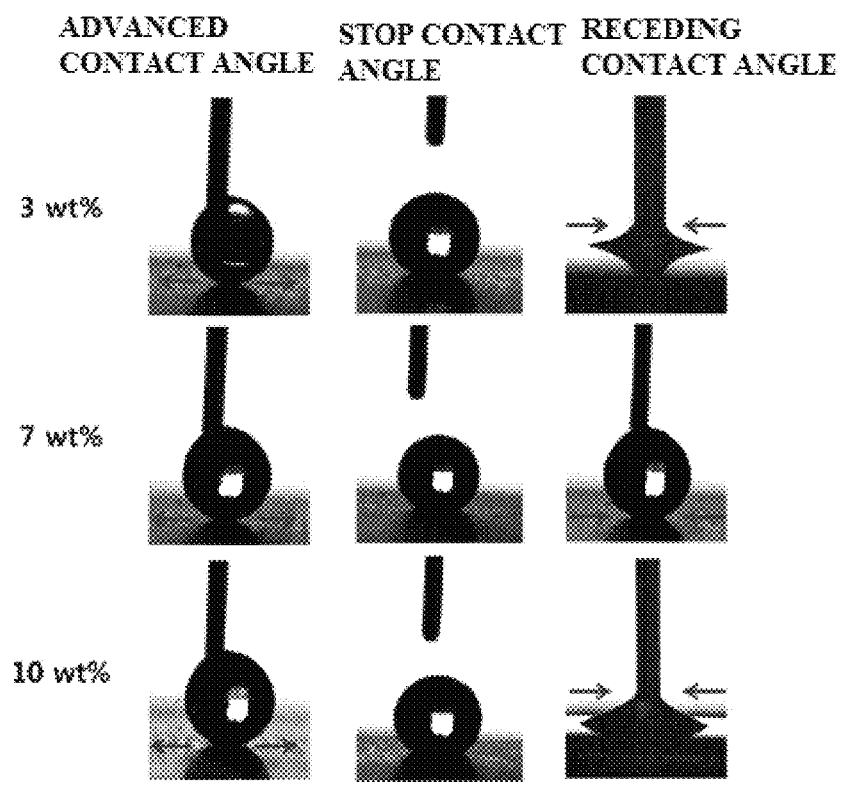
[Fig 8]

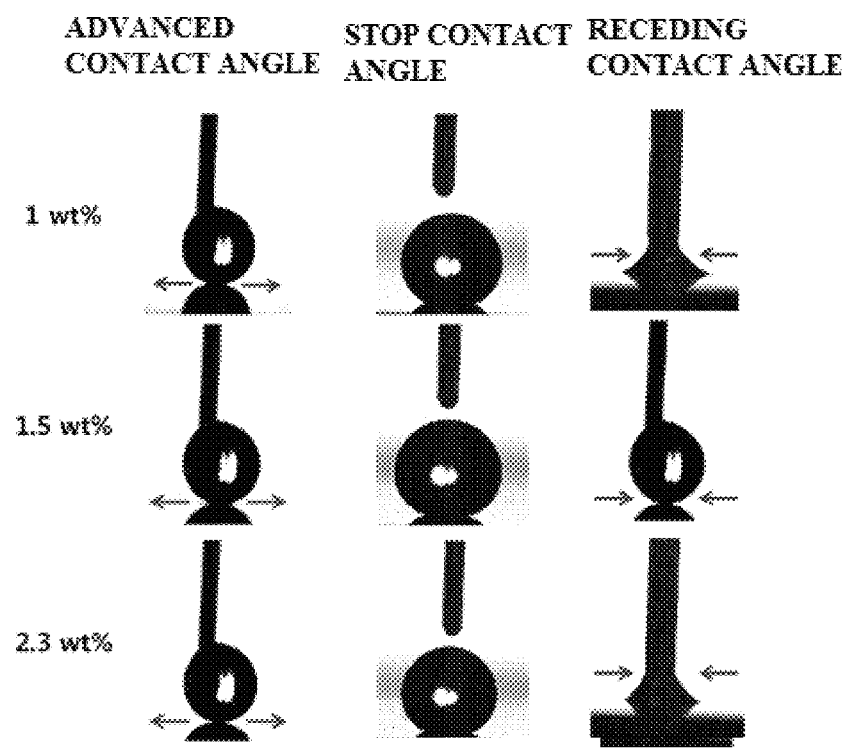
[Fig 9]

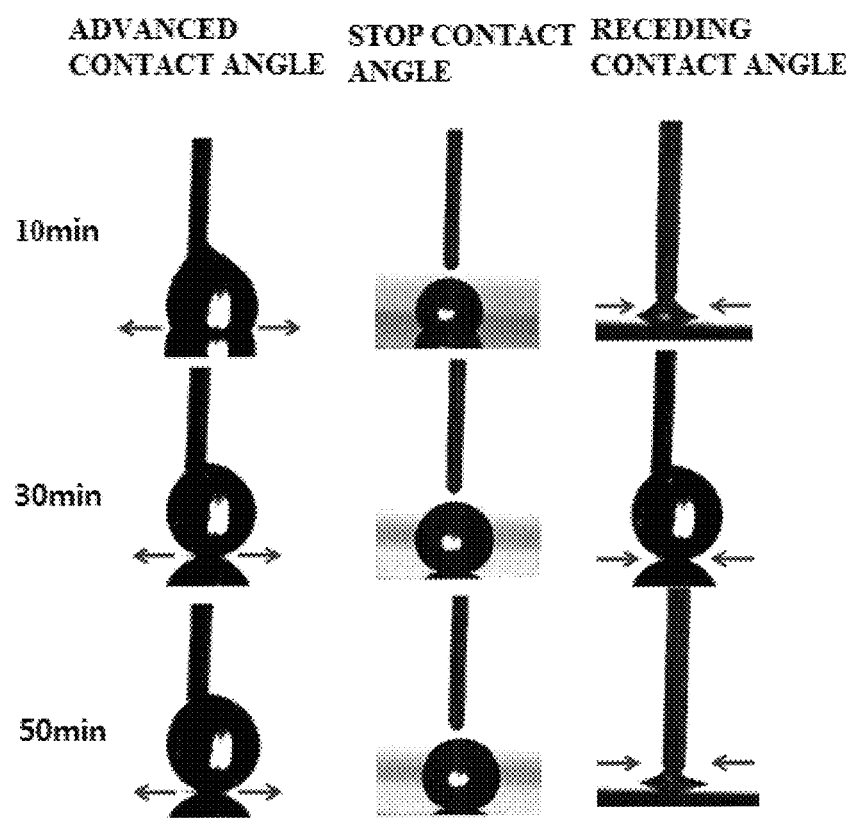
[Fig 10]

[Fig 11]
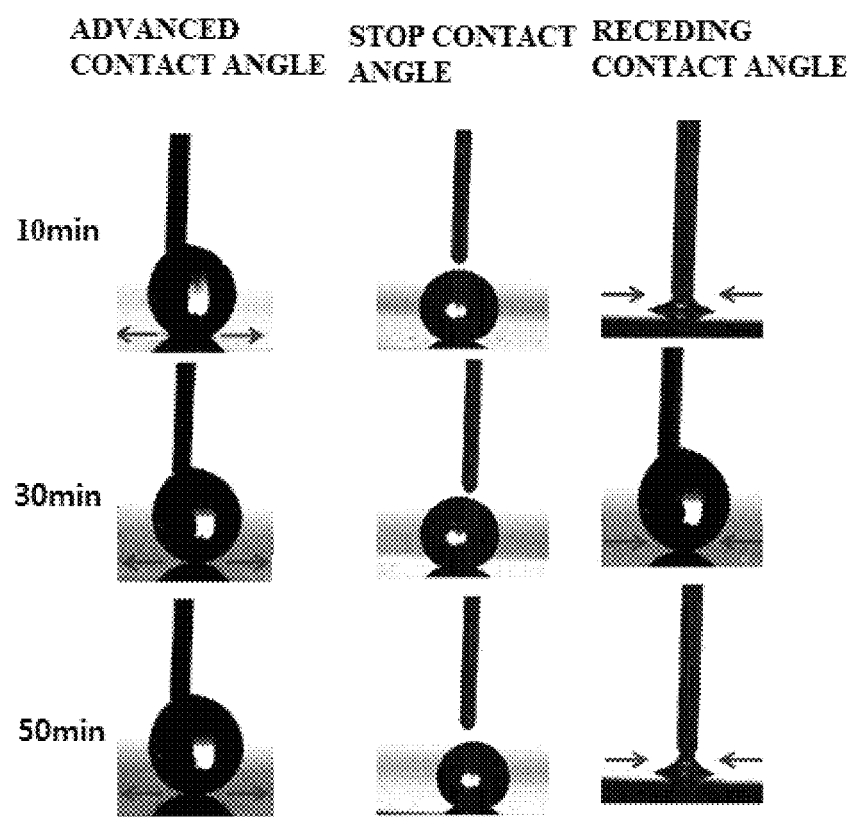

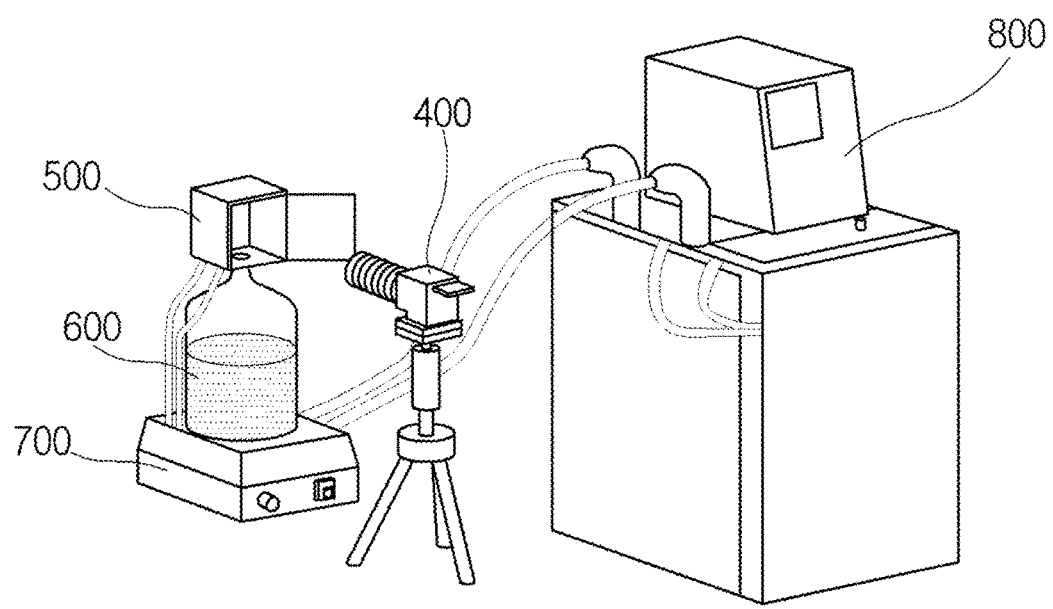
[Fig 12]

[Fig 13]
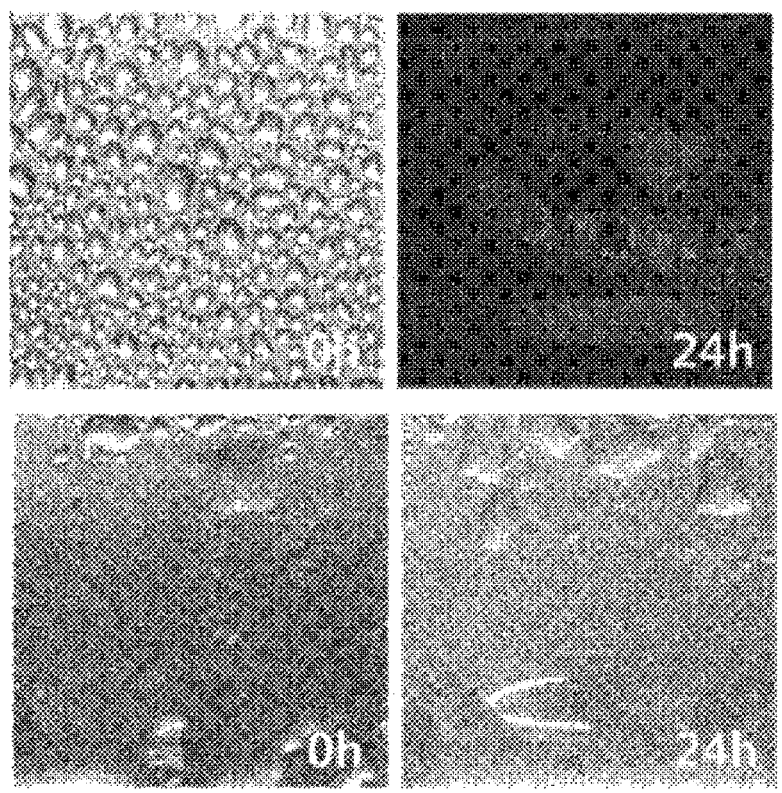

[Fig 14]
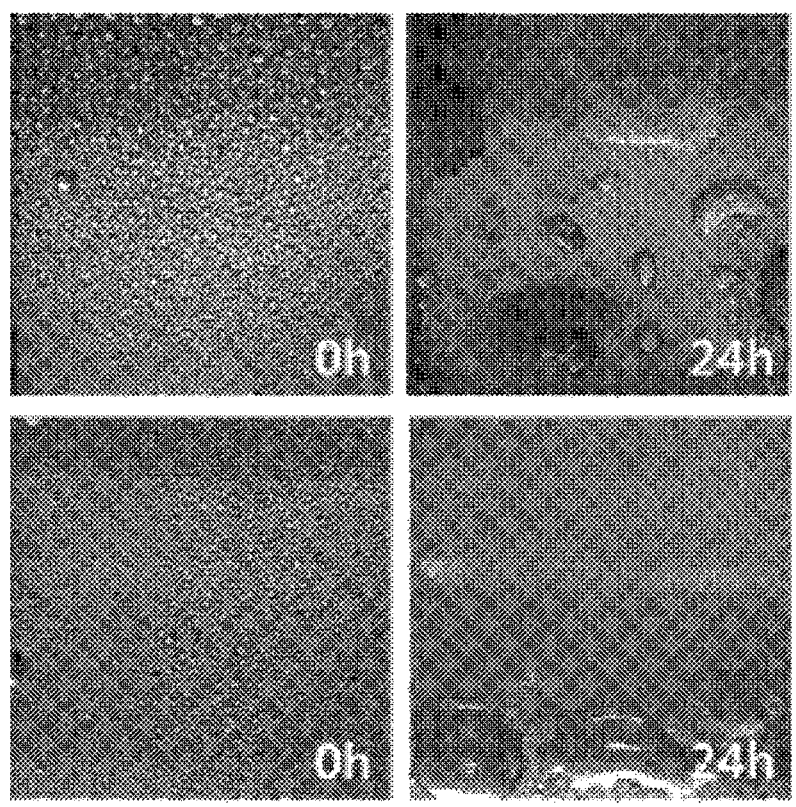

[Fig 15]
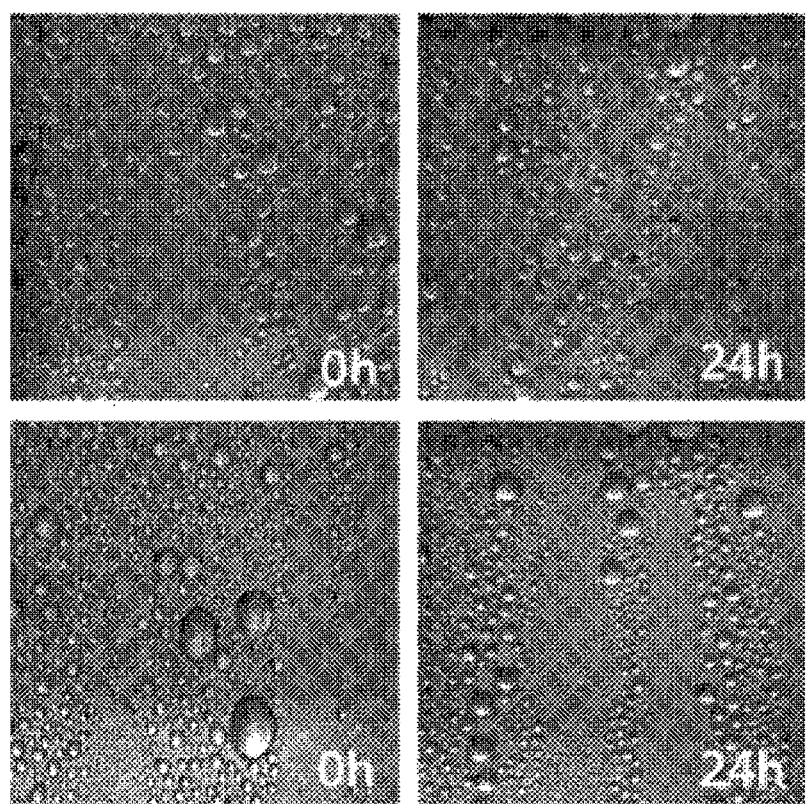

[Fig 16]
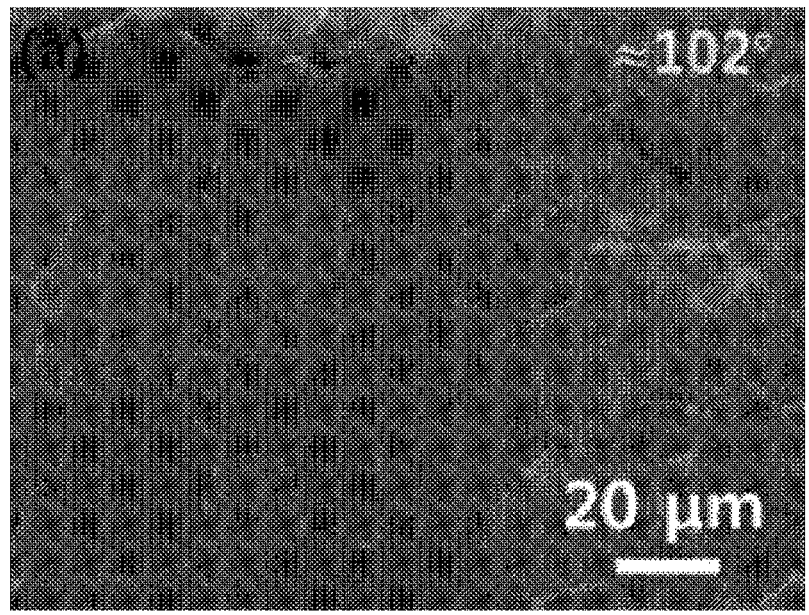
[Fig 17]
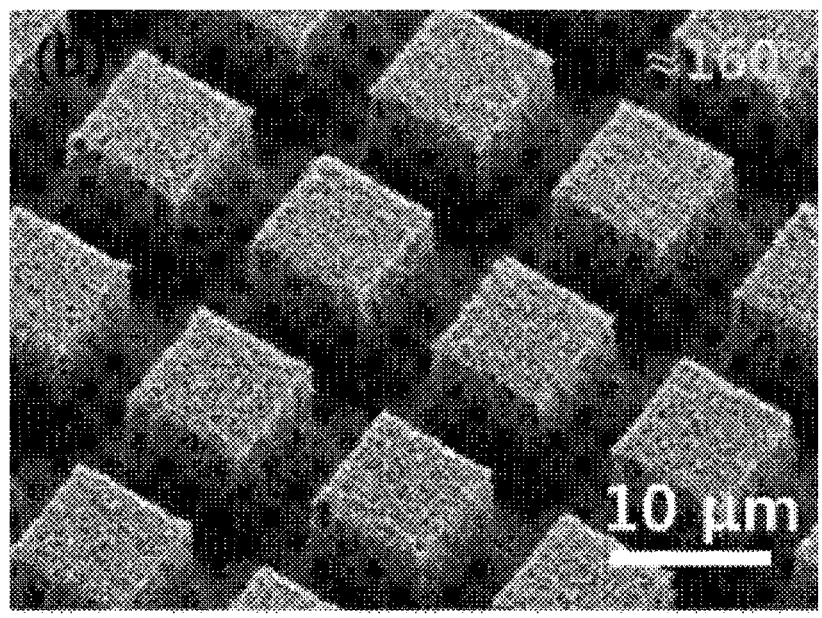

[Fig 18]
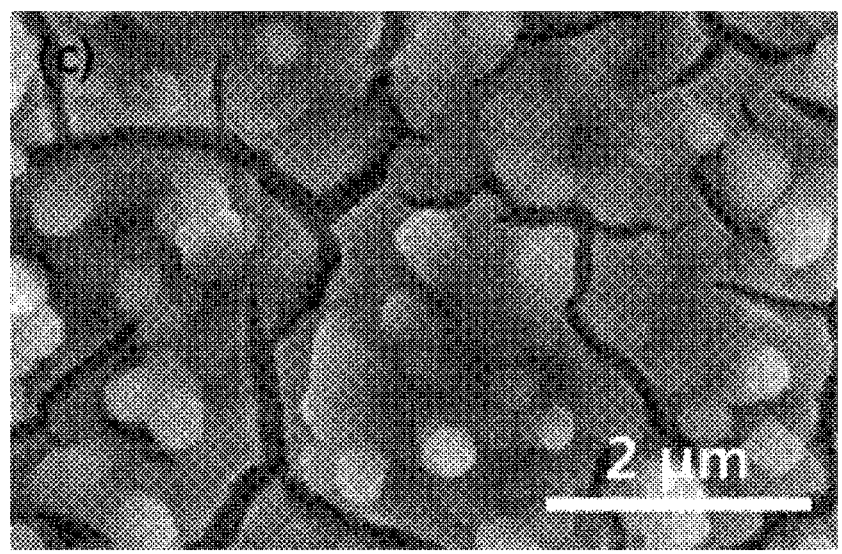

[Fig 19]
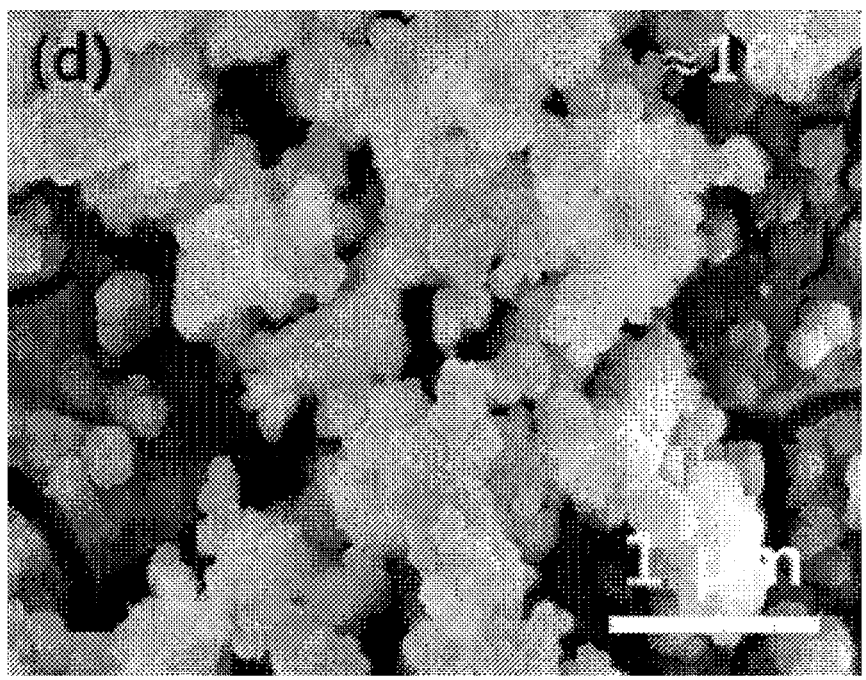

[Fig 20]
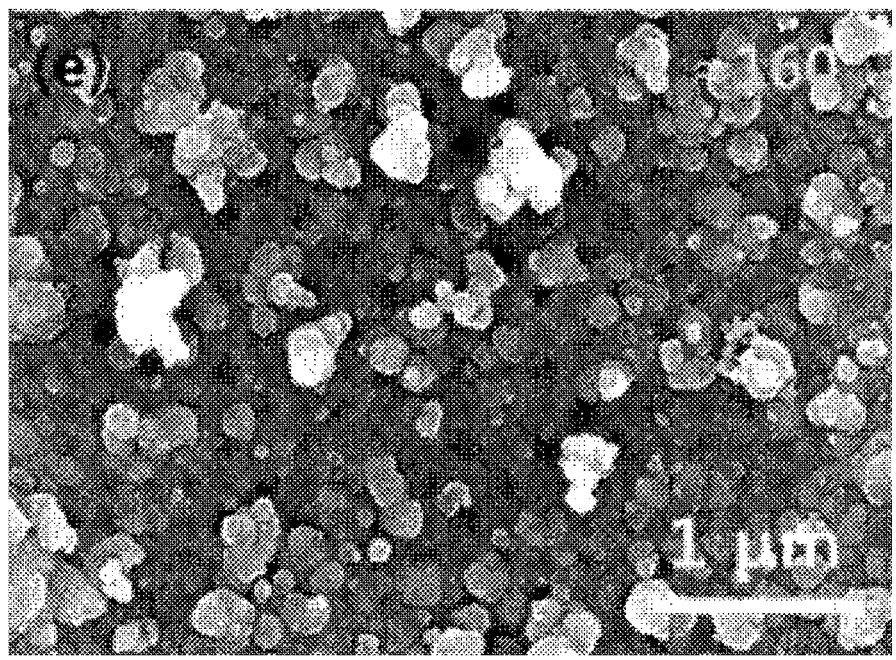
[Fig 21]
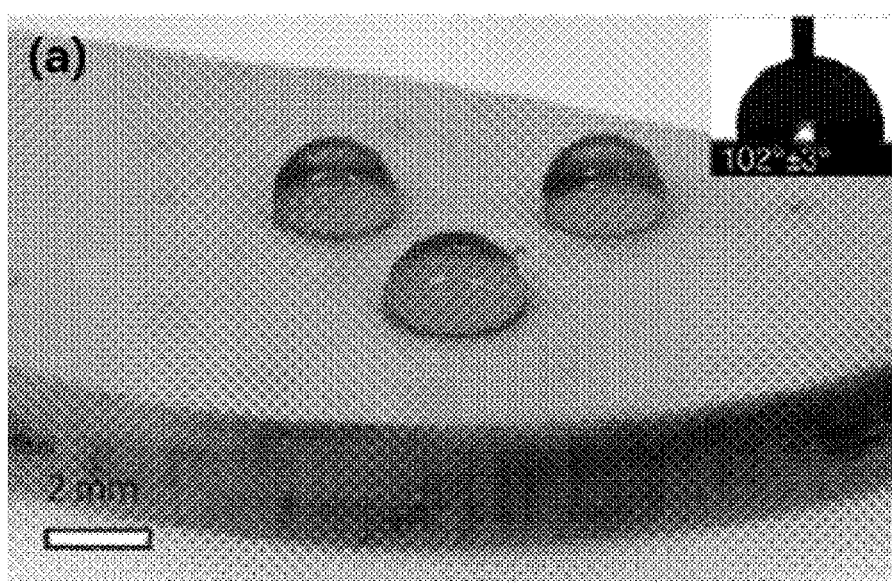

[Fig 22]
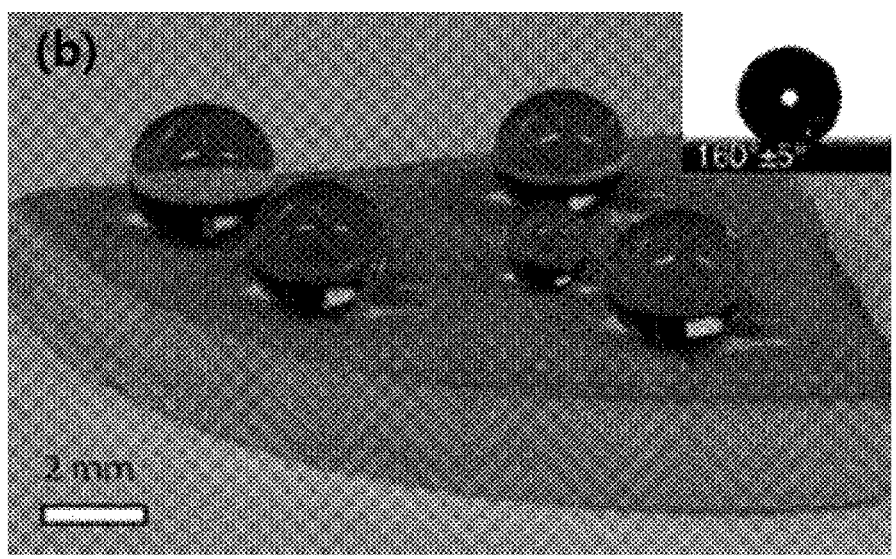

[Fig 23]
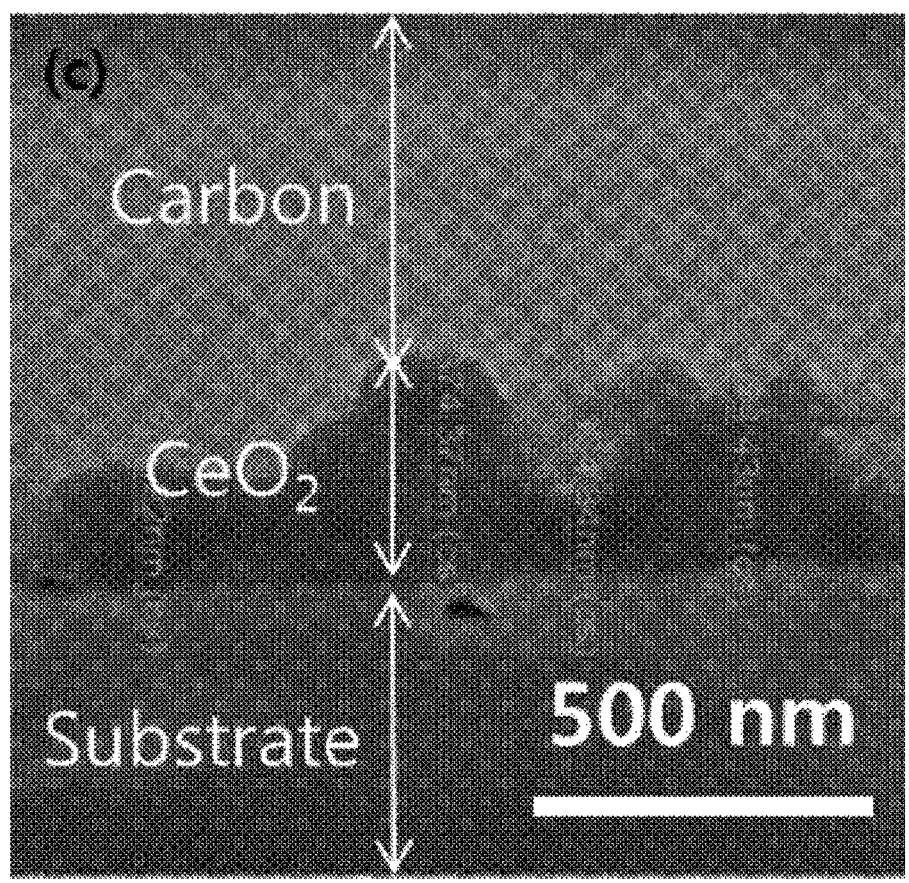

[Fig 24]
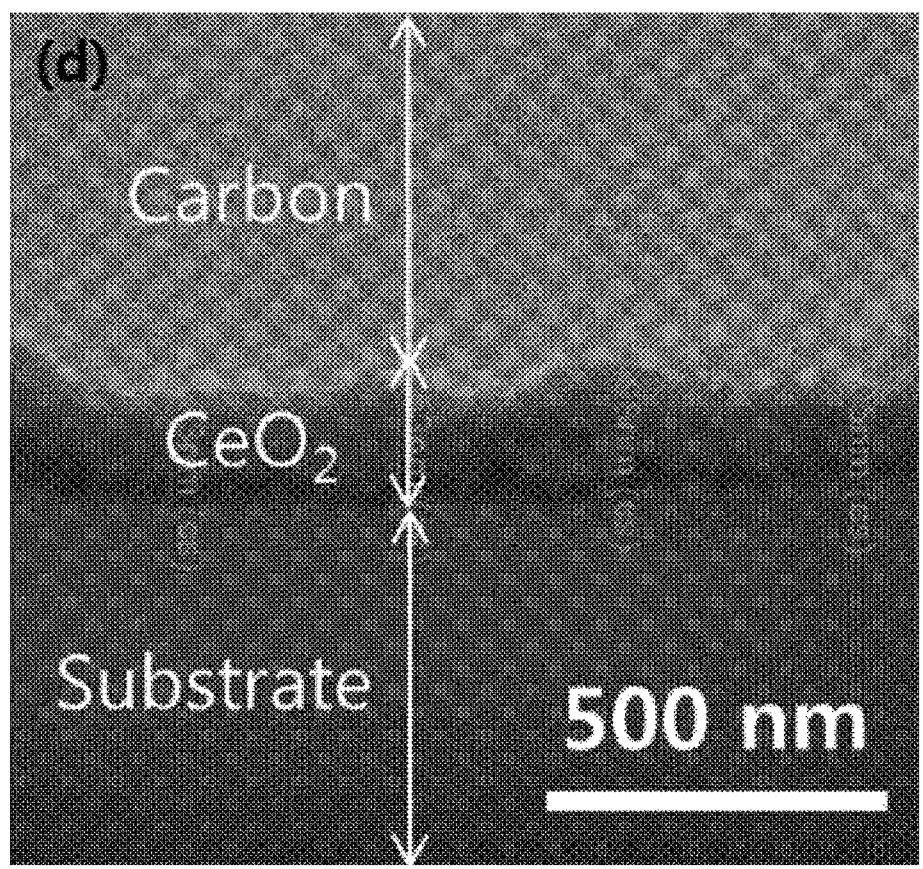

HEAT TRANSFER TUBE HAVING RARE-EARTH OXIDE SUPERHYDROPHOBIC SURFACE AND METHOD FOR MANUFACTURING THE SAME

CROSS-REFERENCE TO RELATED APPLICATION(S)

This application claims priority to Korean Patent Application No. 10-2016-0151124, filed on Nov. 14, 2016, the disclosure of which is incorporated herein by reference in its entirety.

BACKGROUND

Exemplary embodiments of the present disclosure relate to a heat transfer tube having a rare-earth oxide superhydrophobic surface and a method for manufacturing the same, and more particularly, to a heat transfer tube having a rare-earth oxide superhydrophobic surface by depositing a rare-earth oxide layer and a method for manufacturing the same.

A nuclear power plant or a thermal power plant generates heat using uranium, petroleum, coal, or the like as fuel to heat a water circulating a system with the generated heat, thereby forming steam. The formed steam rotates a turbine to produce electricity and the steam passing through the turbine is cooled in a condenser to be changed to water again. In particular, in a steam circulation power generation system, a water cooling type that performs cooling with water in a condensing process requires a large quantity of cooling water. Here, as the cooling water used in the condenser, sea water is used. Therefore, to smoothly supply and discharge the sea water used as the cooling water, the steam circulation power generation system is generally installed near the coast.

In other words, the condenser is expressed as a steam condenser and the steam condenser makes sea water continuously flow in a heat transfer tube of the condenser to continuously turn a temperature of an inner wall of the condenser down. Then, the steam is cooled in the moment that steam discharged through a valve to rotate the turbine is directly bumped into the inner wall of the condenser and becomes condensed water (in a state in which steam returns to water) and the condensed water again returns to a boiler pipe into water of about 500° C. and passes through the turbine via the valve.

The boiler continuously makes hot water into supersaturated steam and belches out the steam to the turbine through the valve and the steam condenser continuously repeats a process of suddenly cooling the steam to return the steam to water again.

At this point, the cooling water cooling an outer wall of the condenser requires a large quantity of water incomparable to that of the cooling water cooling the mechanical friction heat, and sea water needs to be continuously supplied while a power generator is operated.

The steam rotating the turbine contacts the inner wall of the condenser, and thus is cooled into water. At this point, to increase the quantity of steam contacting the inner wall of the condenser, a plurality of heat transfer tubes are included to increase a contact area.

The condenser may corrode due to condensation at an outside of the tube, and may corrode due to a condensed fluid remaining on a surface thereof, and the like. Similarly, even in the case of a heat exchanger used in a power plant, the condenser may corrode due to the condensation at the outside of the tube when heat is exchanged between channels crossly passing through a heat transfer plate, and corrode due to the condensed fluid remaining on the surface thereof, and the like.

One attempt to address this problem is a cross-linked repellent thin film that includes resin having a fluorine atom containing group; quaternary ammonium group-containing modified epoxy resin; and amino resin. However, the repellent thin film has a problem in that it is difficult to form a superhydrophobic thin film in which a contact angle between the surface thereof and a water drop is equal to or more than 150° and it is difficult to hold repellent coating even under a high temperature environment.

Therefore, an improved heat transfer tube and a method for manufacturing the same capable of forming superhydrophobic thin film and of holding repellent coating even under the high temperature environment is desirable.

BRIEF SUMMARY

An object of the present disclosure is to provide a heat transfer tube having a rare-earth oxide superhydrophobic surface and a method for manufacturing the same.

Another object of the present disclosure is to provide a heat transfer tube capable of forming a superhydrophobic surface even under the high temperature environment by deposing rare-earth oxide on a surface of the heat transfer tube and a method for coating a rare-earth oxide.

Still another object of the present disclosure is to provide a heat transfer tube capable of performing coating on a complex shape to coat a plurality of assembled heat transfer tubes by depositing rare-earth oxide using a method for dipping a surface of the heat transfer tube and coating the same, thereby reducing or preventing the heat transfer tubes from being damaged during the assembling of the heat transfer tubes after the coating and a method for manufacturing the same.

Other objects and advantages of the present disclosure will be more clearly described below with reference to the detailed description and the claims.

Examples of the present disclosure are provided in order to more completely explain the present disclosure to those skilled in the art. Examples below may be modified in several different forms and does not limit a scope of the present disclosure. Rather, these exemplary embodiments are provided in order to make this disclosure more thorough and complete and completely transfer ideas of the present disclosure to those skilled in the art.

In addition, a thickness or a size of each layer will be exaggerated for convenience of explanation or clarity and the same reference numbers will indicate the same components throughout the drawings. As used in the present specification, a term "and/or" includes any one or at least one combination of enumerated items.

Terms used in the present specification are for explaining the embodiments rather than limiting the present disclosure. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

A heat transfer tube of the present disclosure means including a channel of a heat exchanger as well as a heat transfer tube configuring a condenser.

In accordance with one aspect of the present disclosure, there is provided, a method for manufacturing a heat transfer tube having a rare-earth oxide superhydrophobic surface, including: 1) preparing a rare-earth oxide coating solution including $Ce(NO_3)_3$, peroxide, and water; 2) sonicating the heat transfer tube; 3) dipping the sonicated heat transfer tube of the step 2) into an acidic solution; and 4) dipping the heat transfer tube dipped into the acidic solution of the step 3) into the rare-earth oxide coating solution of the step 1) to form a coating layer on a surface of the heat transfer tube, wherein the coating layer includes the rare-earth oxide.

The preparing of the rare-earth oxide coating solution of the step 1) may include: 1-1) preparing a mixture by mixing the $Ce(NO_3)_3$, the peroxide, and the water; 1-2) sonicating the mixture of the step 1-1); 1-3) agitating the mixture at 500 rpm for 10 to 30 minutes after the sonicating of the step 1-2); and 1-4) stabilizing the mixture for 50 to 70 minutes after the agitating of the step 1-3) ends.

The method may further include: 5) performing a hydrocarbon contamination after the step 4).

The step 5) may include: 5-1) putting a container including alkene of $C_{10-20}$ or an unsaturated fatty acid solution in an airtight container; 5-2) putting the heat transfer tube dipped into the rare-earth coating solution of the step 4) in the airtight container of the step 5-1); and 5-3) heating the airtight container of the step 5-2) in the oven of 40 to 60° C. for 6 hours or more.

In the step 5), the coating layer formed on the surface of the heat transfer tube may further include a carbon coating layer.

The rare-earth oxide coating solution of the step 1) may include 4 to 9 wt % of $Ce(NO_3)_3$, 1.3 to 2 wt % of peroxide, and the balance water.

The step 2) may include: 2-1) putting the heat transfer tube in acetone and sonicating the heat transfer tube for 3 to 7 minutes; and 2-2) after the step 2-1), putting the heat transfer tube in ethanol and sonicating the heat transfer tube for 3 to 7 minutes.

The heat transfer tube of the step 2) may have a form in which a plurality of heat transfer tubes are assembled.

The acidic solution of the step 3) may be 2M of hydrochloric acid (HCl).

In the step 3), the heat transfer tube may be dipped in 2M of hydrochloric acid (HCl) for 20 to 40 seconds.

In the step 3), a metal oxide layer formed on the surface of the heat transfer tube may be removed by dipping the heat transfer tube in the 2M of hydrochloric acid.

The heat transfer tube may be made of copper or aluminum.

When the heat transfer tube is made of copper, in the step 4), the heat transfer tube may be dipped in the rare-earth oxide coating solution for 20 to 40 minutes.

When the heat transfer tube is made of aluminum, in the step 4), the heat transfer tube may be dipped in the rare-earth oxide coating solution for 30 to 120 minutes.

The rare-earth oxide may be $CeO_2$.

A thickness of the coating layer may range from 100 to 400 nm.

In accordance with another aspect of the present disclosure, there is provided a heat transfer tube having a rare-earth oxide superhydrophobic surface, including: a coating layer formed on a surface of the heat transfer tube by the manufacturing method, wherein the coating layer includes the rare-earth oxide.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an SEM photograph of a heat transfer tube having a rare-earth oxide superhydrophobic surface according to the present disclosure;

FIG. 2 is a FIB photograph of the heat transfer tube having a rare-earth oxide superhydrophobic surface according to the present disclosure;

FIG. 3 is a SEM photograph of the heat transfer tube having a rare-earth oxide superhydrophobic surface according to the present disclosure;

FIG. 4 is a flow chart of a method for manufacturing a heat transfer tube having a rare-earth oxide superhydrophobic surface according to the present disclosure;

FIG. 5 is a flow chart of a method for preparing a rare-earth coating solution according to the present disclosure;

FIG. 6 is a flow chart of a hydrocarbon contamination step according to the present disclosure;

FIG. 7 is a diagram of the hydrocarbon contamination step according to the present disclosure;

FIG. 8 is a photograph of a measurement result for a contact angle depending on a content range of wt % of $Ce(NO_3)_3$ in a rare-earth coating solution for manufacturing the heat transfer tube having a rare-earth oxide superhydrophobic surface according to the present disclosure;

FIG. 9 is a photograph of a measurement result for a contact angle depending on a content range of wt % of peroxide in the rare-earth coating solution for manufacturing the heat transfer tube having a rare-earth oxide superhydrophobic surface according to the present disclosure;

FIG. 10 is a photograph of a measurement result for a contact angle depending on a dipping time of the heat transfer tube made of copper to manufacture the heat transfer tube having a rare-earth oxide superhydrophobic surface according to the present disclosure;

FIG. 11 is a photograph of a measurement result for a contact angle depending on a dipping time of the heat transfer tube made of aluminum to manufacture the heat transfer tube having a rare-earth oxide superhydrophobic surface according to the present disclosure;

FIG. 12 is a diagram of measurement equipment for measuring thermal disclosure;

FIG. 13 is a photograph of an experiment result of measuring thermal stability;

FIG. 14 is a photograph of the experiment result of measuring thermal stability;

FIG. 15 is a photograph of the experiment result of measuring thermal stability;

FIG. 16 is a comparison photograph for measuring a change in contact angle due to a difference in form;

FIG. 17 is the comparison photograph for measuring the change in contact angle due to the difference in form;

FIG. 18 is the comparison photograph for measuring the change in contact angle due to the difference in form;

FIG. 19 is the comparison photograph for measuring the change in contact angle due to the difference in form;

FIG. 20 is the comparison photograph for measuring the change in contact angle due to the difference in form;

FIG. 21 is an SEM photograph and an FIB comparison photograph of a sample due to a difference in a manufacturing method for coating rare-earth oxide;

FIG. 22 is the SEM photograph and the FIB comparison photograph of the sample due to the difference in the manufacturing method for coating rare-earth oxide;

FIG. 23 is the SEM photograph and the FIB comparison photograph of the sample due to the difference in the manufacturing method for coating rare-earth oxide; and FIG. 24 is the SEM photograph and the FIB comparison photograph of the sample due to the difference in the manufacturing method for coating rare-earth oxide.

DETAILED DESCRIPTION

Hereinafter, the present disclosure will be described in more detail with reference to Example. These exemplary embodiments are to describe in more detail and it will be apparent to those skilled in the art that the scope of the present disclosure is not limited to these exemplary embodiments.

A heat transfer tube having a rare-earth oxide superhydrophobic surface and a method for manufacturing the same according to the present disclosure will be described in more detail with reference to FIGS. 1 to 6.

FIG. 1 is an SEM photograph of a heat transfer tube having a rare-earth oxide superhydrophobic surface according to the present disclosure, in which the heat transfer tube made of copper and the heat transfer tube made of aluminum are coated by being dipped in a rare-earth solution. Referring to FIG. 1, it may be confirmed that the rare-earth oxide is coated on the copper or aluminum surface.

FIGS. 2 and 3 are FIB (focused ion beam) photographs of a heat transfer tube having a rare-earth oxide superhydrophobic surface according to the present disclosure, in which the coating component and the thickness range of the coating may be confirmed. FIG. 2 is an FIB photograph for the heat transfer tube made of copper, in which the rare-earth oxide is coated, a thickness range ranges from 134 to 375 nm, and an average thickness is 274 nm, but the present disclosure is not limited to the example.

Further, FIG. 3 is an FIB photograph for the heat transfer tube made of aluminum, in which the rare-earth oxide is coated, a thickness range ranges from 144 to 210 nm, and an average thickness is 180 nm, but the present disclosure is not limited to the example.

It may be confirmed from FIGS. 2 and 3 that the heat transfer tube is dipped into the rare-earth coating solution to have the rare-earth oxide deposited on a surface thereof, in which the coating layer has a thickness ranging from 100 to 400 nm and an average thickness ranging from 100 to 250 nm and is made of the thin rare-earth oxide.

Referring to FIGS. 2 and 3, the heat transfer tube has rare-earth oxide coated on the surface thereof and may further include carbon (C). That is, the surface of the heat transfer tube may include the rare-earth oxide and the carbon (C). When the surface of the heat transfer tube is coated with only the rare-earth oxide, surface energy is increased and thus a contact angle is low, but a coating layer is added with the carbon C having low surface energy, thereby increasing the contact angle. In more detail, when the coating layer of the surface of the heat transfer tube includes only the rare-earth oxide, the low contact angle appears due to a OH group present on the coating layer, but when the carbon (C) is deposited, new bonding is formed and thus a high contact angle may appear, thereby implementing the superhydrophobic surface in the heat transfer tube.

To manufacture the heat transfer tube having the superhydrophobic surface according to the present disclosure, the assembled heat transfer tube is dipped into the rare-earth coating solution to form the coating layer, but additionally, the heat transfer tube coated by being dipped into the rare-earth coating solution is put in an airtight container and may be heated in an oven of 40 to 60° C., and the airtight container may include a container including alkene of $C_{10-20}$ or an unsaturated fatty acid solution, preferably, a container including 1-octadecene or oleic acid, but the present disclosure is not limited to this example.

Referring to FIG. 4, a flow chart of the method for manufacturing a heat transfer tube having a superhydrophobic surface according to the present disclosure includes: 1) preparing a rare-earth coating solution (S100); 2) sonicating the heat transfer tube while putting the heat transfer tube in acetone and ethanol (S200); 3) dipping the sonicated heat transfer tube into hydrochloric acid (S300); and 4) dipping the heat transfer unit into the rare-earth coating solution of the step 1) (S400).

The step 1 (S100) is a step of preparing a rare-earth coating solution and in more detail, FIG. 5 is a flow chart of the method for preparing a rare-earth coating solution according to the present disclosure, which includes 1-1) preparing a mixture by mixing $Ce(NO_3)_3$, peroxide ($H_2O_2$), and water (S110); 1-2) sonicating the mixture of the step 1-1) (S120); 1-3) agitating the sonicated mixture (S130); and 1-4) stabilizing.

The step 1-1) (S110) is a step of mixing the $Ce(NO_3)_3$, the peroxide, and the water, in which the water may be de-ionized water (DI water) but is not limited thereto. In the step 1-1), in more detail, 4 to 9 wt % of $Ce(NO_3)_3$, 1.3 to 2 wt % of peroxide, and the balance water are mixed and when the $Ce(NO_3)_3$ is less than 4 wt % and exceeds 9 wt %, a receding contact angle was measured as less than 10° and even when the peroxide is less than 1.3 wt % and exceeds 2 wt %, the receding contact angle was measured as less than 10°. That is, when wt % of the $Ce(NO_3)_3$ and the peroxide is out of the range, the surface of the heat transfer tube is not uniformly coated, and therefore the phenomenon that a drop of water may be pinned may occur.

When the mixture is prepared in the step 1-1) (S110), in the step 1-2) (S120), the sonication is performed for 15 to 25 minutes and after the sonication, an agitator agitates the mixture at 500 rpm for 10 to 30 minutes and when the agitation ends, in the step 1-3) (S130), the mixture suffers from the stabilizing for 50 to 70 minutes, thereby preparing the rare-earth coating solution.

When the rare-earth coating solution is prepared, the next step is the step (S200) of sonicating the assembled heat transfer tube while putting the heat transfer tube in acetone and ethanol. In more detail, the heat transfer tube is sonicated for 3 to 7 minutes while being put in the acetone solution and then the heat transfer tube is sonicated for 3 to 7 minutes while being put in the ethanol solution. Here, the sonication of the heat transfer tube in the acetone solution and the ethanol solution is performed regardless of order.

The assembled heat transfer tube is sonicated in the acetone solution and the ethanol solution and then 3) the heat transfer tube may be dipped into the hydrochloric acid (S300). As metal includes a metal oxide layer naturally generated, to remove the oxide layer naturally formed on the surface of the heat transfer tube, the heat transfer tube may be dipped into the hydrochloric acid, but the hydrochloric acid is only an example and therefore any acidic solution that may remove the metal oxide layer naturally generated may be used.

The heat transfer tube dipped into the hydrochloric acid is dipped into the rare-earth coating solution of the step 1) (S400) to coat the surface of the heat transfer tube with the rare-earth oxide. In the step (S400) of dipping the heat transfer tube into the rare-earth coating solution, the dipping time may be different depending on whether the heat transfer tube is made of copper or whether the heat transfer tube is made of aluminum. Preferably, when the heat transfer tube is made of copper, in the step 4) (S400), the heat transfer tube may be dipped into the rare-earth coating solution for 20 to 40 minutes and when the heat transfer tube is made of aluminum, in the step 4) (S400), the heat transfer tube may be dipped into the rare-earth coating solution for 30 to 120 minutes.

When the heat transfer tube made of copper may be dipped into the rare-earth coating solution for less than 20 minutes and an excess of 40 minutes, the receding contact angle is less than 10° and when the heat transfer tube made of aluminum may be dipped into the rare-earth coating solution for less than 30 minutes and an excess of 120 minutes, the receding contact angle is less than 10°. That is, when the dipping time of the heat transfer tube made of copper or aluminum into the rare-earth coating solution is out of the range, the surface of the heat transfer tube is not uniformly coated, and therefore the phenomenon that a drop of water may be pinned may occur.

FIG. 6 is a flow chart of a hydrocarbon contamination step of the present disclosure, in which as one embodiment of the present disclosure, in the step (S400) of dipping the assembled heat transfer tube into the rare-earth coating solution, the surface of the heat transfer tube is deposited with the rare-earth oxide to form the coating layer, but the hydrocarbon contamination step (S500) is additionally performed and therefore the surface coating layer of the heat transfer tube may be added with carbon (C).

In more detail, the step (S500) may include 5-1) putting the container including the alkene of $C_{10\text{-}20}$ or the unsaturated fatty acid solution in the airtight container; 5-2) putting the assembled heat transfer tube dipped into the rare-earth coating solution of the step 4) (S400) in the airtight container of the step 5-1); and 5-3) heating the airtight container of the step 5-2) in the oven of 40 to 60° C. for 6 hours or more.

FIG. 7 is a diagram of the hydrocarbon contamination step according to the present disclosure, in which in the hydrocarbon contamination step, the container 100 including the alkene of $C_{10\text{-}20}$ or the unsaturated fatty acid solution and the heater transfer tube 200 are put in the airtight container 300 and the airtight container is heated in the oven of 40 to 60° C. for 6 hours or more.

Example 1

Manufacturing of Heat Transfer Tube Coated with Rare-Earth Oxide (1) Preparation of Rare-Earth Coating Solution The mixture was prepared by mixing 4 wt % of $Ce(NO_3)_3$, 1.3 wt % of peroxide, and 94.7 wt % of de-ionized water and the mixture was sonicated for 20 minutes. The sonicated mixture was sonicated at 500 rpm for 20 minutes by the agitator and stabilized for 1 hour, thereby preparing the rare-earth coating solution.

(2) Coating of Heat Transfer Tube Made of Copper

The assembled heat transfer tube was sonicated in the acetone solution for 5 minutes and sonicated in the ethanol solution for 5 minutes. The assembled heat transfer tube was sonicated in the acetone solution and the ethanol solution and dipped in 2 M of hydrochloric acid (HCL) for 30 seconds.

The heat transfer tube made of copper and dipped into the hydrochloric acid was dipped into the rare-earth coating solution for 30 minutes.

(4) Hydrocarbon Contamination Step 1-octadecene of 25 ml/m³ or more was put in the airtight container and the heat transfer tube dipped into the rare-earth coating solution of the (2) was put therein. The airtight container was heated in the oven at a temperature of 40 to 60° C. for 6 hours.

Experimental Example 1

Comparison of difference in coating state depending on concentration of $Ce(NO_3)_3$

TABLE 1

|  | Content range |
|---|---|
| Example 2 | 7 wt % |
| Example 3 | 9 wt % |
| Comparative Example 1 | 3 wt % |
| Comparative Example 2 | 10 wt % |

To compare the difference in the coating state depending on a concentration of $\approx Ce(NO_3)_3$, the rare-earth coating solution was prepared by making the concentration of $Ce(NO_3)_3$ different as follow. In more detail, the rare-earth coating solution has a powder form and is changed to $CeO_2$ by a chemical reaction with other solutions and is deposited on the surface of the heat transfer tube in the changed $CeO_2$ state. To find out an optimal concentration range of $Ce(NO_3)_3$, the coating difference was observed by fixing the peroxide to 1.3 wt % and changing $Ce(NO_3)_3$ from 1 wt % to 15 wt % by 1 wt %. When a solvent is the de-ionized water, if the accurate quantity of $Ce(NO_3)_3$ added to the solution is A wt %, it may be calculated by A×1000÷(100−A) g. That is, the coating state was confirmed while the quantity of $Ce(NO_3)_3$ is changed from 10.1 g to 176.47 g.

TABLE 2

|  |  | Advanced contact angle (°) | Stop contact angle (°) | Receding contact angle (°) |
|---|---|---|---|---|
| Comparative Example 1 | 3 wt % | 158.4 ± 0.7 | 152.5 ± 0.8 | <10 |
| Example 1 | 4 wt % | 162.6 ± 0.8 | 163.9 ± 4.4 | 161.3 ± 5.2 |
| Example 2 | 7 wt % | 161.0 ± 0.7 | 158.7 ± 0.5 | 157.6 ± 3.2 |
| Example 3 | 9 wt % | 162.4 ± 1.7 | 161.8 ± 3.0 | 156.4 ± 1.2 |
| Comparative Example 2 | 10 wt % | 159.9 ± 0.7 | 157.4 ± 1.0 | <10 |

It was confirmed from FIG. 8 and the result of the above Table 2 that an optimal quantity of $Ce(NO_3)_3$ ranges from 4 to 9 wt % (41.68 g to 98.9 g). As shown in the above Table 2, the contact angles between 4 wt % and 9 wt % corresponding to the minimum/maximum quantity of the optimal range, the contact angle at 7 wt % included in the range, and the contact angles at 3 wt % and 10 wt % out of the range were measured. All the contact angles well appeared as about 160° within the corresponding range but as could be appreciated in FIG. 8, the receding contact angles of 3 wt % and 10 wt % out of the range were measured as less than 10°. That is, if the contact angle is out of the optimal range of $Ce(NO_3)_3$, the phenomenon that a drop of water is pinned occurs, which may be determined that the coating is not uniformly made.

Experimental Example 2

Comparison of difference in coating state depending on concentration of $H_2O_2$

TABLE 3

| | Content range |
|---|---|
| Example 4 | 1.5 wt % |
| Example 5 | 2.0 wt % |
| Comparative Example 3 | 1 wt % |
| Comparative Example 4 | 2.3 wt % |

The $H_2O_2$ is generally a solution used to cause a catalytic reaction and was used to change $Ce(NO_3)_3$ to $CeO_2$ using property having strong oxidizing power. To find out the optimal concentration range of $H_2O_2$, the coating difference was observed by fixing the $Ce(NO_3)_3$ to 4 wt % and changing the concentration of $H_2O_2$ from 0.5 wt % to 2.5 wt % by 0.25 wt %. The used $H_2O_2$ solution is a 35% diluted solution and the coating state was confirmed while being changed from 5.02 mL to 52.63 mL.

TABLE 4

| | | Advanced contact angle (°) | Stop contact angle (°) | Receding contact angle (°) |
|---|---|---|---|---|
| Comparative Example 3 | 1 wt % | 147.1 ± 2.9 | 148.1 ± 4.1 | <10 |
| Example 1 | 1.3 wt % | 162.4 ± 1.5 | 161.5 ± 2.7 | 161.7 ± 3.4 |
| Example 4 | 1.5 wt % | 158.9 ± 3.0 | 158.9 ± 2.7 | 158.3 ± 3.7 |
| Example 5 | 2.0 wt % | 159.5 ± 0.9 | 159.4 ± 1.5 | 158.3 ± 3.6 |
| Comparative Example 4 | 2.3 wt % | 159.9 ± 0.7 | 159.4 ± 3.0 | <10 |

Referring to the above Table 4 and FIG. 9, the range of an optimal quantity of $H_2O_2$ was confirmed as 1.3 wt % to 2.0 wt % (25.64 mL to 41.67 mL). As shown in the above Table 4, the contact angle between 1.3 wt % and 2.0 wt % corresponding to the minimum/maximum quantity of the optimal range, the contact angle at 1.5 wt % included in the range, and the contact angle at 1 wt % and 2.3 wt % out of the range were measured. All the contact angles well appeared as about 160° within the corresponding range but as could be appreciated in the above Table 4 and FIG. 9, the receding contact angles of 1 wt % and 2.3 wt % out of the range were measured as less than 10°. That is, if the contact angle is out of the optimal range, the phenomenon that a drop of water is pinned occurs, which may be determined that the coating is not uniformly made.

Experimental Example 3

Comparison of difference in coating state depending on dipping time of heat transfer tube made of copper

TABLE 5

| | Dipping time |
|---|---|
| Example 6 | 20 minutes |
| Example 7 | 40 minutes |
| Comparative Example 5 | 10 minutes |
| Comparative Example 6 | 50 minutes |

When a copper surface is put in a solution prepared with 4 wt % of $Ce(NO_3)_3$, 1.3 wt % of $H_2O_2$, and 1000 mL of de-ionized (DI water), the change in the coating state was confirmed over time. The change in the coating state was confirmed by taking out the copper surface every 5 minutes from 5 minutes to 60 minutes.

TABLE 6

| | Advanced contact angle (°) | Stop contact angle (°) | Receding contact angle (°) |
|---|---|---|---|
| Comparative Example 5 | 114.9 ± 1.6 | 110.6 ± 0.7 | <10 |
| Example 6 | 159.5 ± 0.5 | 158.3 ± 1.2 | 154.9 ± 0.3 |
| Example 1 | 162.4 ± 1.5 | 161.5 ± 2.7 | 161.7 ± 3.4 |
| Example 7 | 160.6 ± 0.3 | 160.7 ± 0.4 | 159.3 ± 1.5 |
| Comparative Example 6 | 149.4 ± 1.7 | 150.8 ± 2.7 | <10 |

Referring to the above Table 6 and FIG. 10, an optimal time range of the copper surface was confirmed as 20 to 40 minutes. As shown in the above Table 6, the contact angles at 20 minutes and 40 minutes corresponding to the minimum/maximum time of the optimal time range, the contact angle at 30 minutes included in the range, and the contact angles at 10 minutes and 50 minutes out of the range were measured. All the contact angles well appeared as about 160° within the corresponding range, but as could be appreciated in the above Table 6 and FIG. 10, the receding contact angles of 10 minutes and 50 minutes out of the range were measured as less than 10°. That is, if the contact angle is out of the optimal range, the phenomenon that a drop of water is pinned occurs, which may be determined that the coating is not uniformly made.

Experimental Example 4

Comparison of difference in coating state depending on dipping time of heat transfer tube made of aluminum

TABLE 7

| | Dipping time |
|---|---|
| Example 8 | 30 minutes |
| Example 9 | 60 minutes |
| Example 10 | 120 minutes |
| Comparative Example 7 | 5 minutes |
| Comparative Example 8 | 180 minutes |

When an aluminum surface is put in a solution prepared with 4 wt % of $Ce(NO_3)_3$, 1.3 wt % of $H_2O_2$, and 1000 mL of de-ionized (DI water), the change in the coating state was confirmed over time. The change in the coating state was confirmed by taking out the aluminum surface every 30 minutes from 5 minutes to 180 minutes.

TABLE 8

| | Advanced contact angle (°) | Stop contact angle (°) | Receding contact angle (°) |
|---|---|---|---|
| Comparative Example 7 | 151.5 ± 2.6 | 148.8 ± 1.2 | <10 |
| Example 8 | 161.0 ± 1.6 | 161.1 ± 1.1 | 158.3 ± 2.1 |
| Example 9 | 161.2 ± 3.2 | 161.0 ± 1.9 | 160.1 ± 1.8 |
| Example 10 | 162.6 ± 0.8 | 163.9 ± 4.4 | 161.3 ± 5.2 |
| Comparative Example 8 | 157.3 ± 1.6 | 156.1 ± 0.8 | <10 |

Referring to the above Table 8 and FIG. 11, an optimal time range of the aluminum surface was confirmed as 30 to 120 minutes. As shown in the above Table 8, the contact angles at 30 minutes and 120 minutes corresponding to the minimum/maximum time of the optimal time range, the contact angle at 60 minutes included in the range, and the contact angles at 5 minutes and 150 minutes out of the range were measured. All the contact angles well appeared as about 160° within the corresponding range, but as could be appreciated in the above Table 8 and FIG. 11, the receding contact angles of 5 minutes and 180 minutes out of the range were measured as less than 10°. That is, if the contact angle is out of the optimal range, the phenomenon that a drop of water is pinned occurs, which may be determined that the coating is not uniformly made.

Experimental Example 5

Component analysis result for coating layer of heat transfer tube having superhydrophobic surface The analysis result of the EDS result for the heat transfer tube of Examples 1 and 10 is the following Table 9 and 10.

TABLE 9

| Element | Weight % | Atomic % |
|---------|----------|----------|
| C       | 5.3      | 28.06    |
| Cu      | 53.07    | 53.06    |
| Ce      | 41.63    | 18.88    |
| Totals  | 100      |          |

TABLE 10

| Element | Weight % | Atomic % |
|---------|----------|----------|
| C       | 12.31    | 41.92    |
| Al      | 26.55    | 40.24    |
| Ce      | 61.13    | 17.84    |
| Totals  | 100      |          |

The above Table 9 dips the heat transfer tube made of copper in the rare-earth coating solution to form the coating layer, and as the result of measuring the EDS for the heat transfer tube, may confirm that a Ce element that is rare-earth metal to be coated is deposited and C is deposited due to the hydrocarbon contamination step.

Similarly, the above Table 10 dips the heat transfer tube made of aluminum in the rare-earth coating solution to form the coating layer, and as the result of measuring the EDS for the heat transfer tube, may confirm that a Ce element that is rare-earth metal to be coated is deposited and C is deposited due to the hydrocarbon contamination step.

Experimental Example 6

Assessment Result of Thermal Stability

As illustrated in FIG. 12, to compare the difference in the condensation behavior of the sample coated by the method different from the sample coated with rare-earth in the harsh environment, the experiment was performed by the simple configuration. The experiment was planned to manufacture an acrylic chamber 500 and attach a cold plate to a back surface of the acrylic chamber 500 to control the surface temperature to be about 28° C., attach a large capacity of beaker 600 to a bottom surface thereof and boil water in the beaker using a hot plate 700 to directly supply hot steam into the acrylic chamber 500 and directly collect drops of water generated due to the condensation (S~25.30). A more detailed manufacturing method thereof is as the following Table 11.

TABLE 11

| | |
|---|---|
| Comparative Example 9 | The copper sample was manufactured by being dipped into acetone and ethanol, respectively, sonicated for 5 minutes, and dipped into 2M of HCl for 30 seconds, washed with the de-ionized water (DI water), and dried with nitrogen gas. |
| Comparative Example 10 | The aluminum sample was manufactured by being dipped into acetone and ethanol, respectively, sonicated for 5 minutes, and dipped into 2M of HCl for 30 seconds, washed with the de-ionized water (DI water), and dried with nitrogen gas. |
| Comparative Example 11 | The copper sample treated as shown in the Comparative Example 9 was manufactured by being put in the airtight container together with a solution formed by mixing toluene and heptadeca-fluoro-1,1,2,2,2 tetrahydrodecyl trichlorosilane (HDFS) solution at 20:1 and putting the airtight container in an oven of 85° C. for 3 hours. |
| Comparative Example 12 | The aluminum sample treated as shown in the Comparative Example 10 was manufactured by being put in the airtight container together with a solution formed by mixing toluene and heptadeca-fluoro-1,1,2,2,2 tetrahydrodecyl trichlorosilane (HDFS) solution at 20:1 and putting the airtight container in an oven of 85° C. for 3 hours. |

TABLE 12

| | Advanced contact angle (°) | | Stop contact angle (°) | | Receding contact angle (°) | |
|---|---|---|---|---|---|---|
| | Before experiment | After 24 hours | Before experiment | After 24 hours | Before experiment | After 24 hours |
| Comparative Example 9 | 84.1 ± 1.7 | 62.3 ± 6.5 | 78.4 ± 1.4 | 60.4 ± 7.3 | 30.8 ± 3.5 | <10 |

TABLE 12-continued

| | Advanced contact angle (°) | | Stop contact angle (°) | | Receding contact angle (°) | |
|---|---|---|---|---|---|---|
| | Before experiment | After 24 hours | Before experiment | After 24 hours | Before experiment | After 24 hours |
| Comparative Example 10 | 92.8 ± 0.1 | 36.6 ± 1.7 | 86.8 ± 1.6 | 35.1 ± 4.9 | 26.4 ± 3.4 | <10 |
| Comparative Example 11 | 122.5 ± 2.0 | 78.1 ± 1.1 | 116.3 ± 5.6 | 77.3 ± 1.5 | 73.1 ± 5.6 | 48.8 ± 3.5 |
| Comparative Example 12 | 123.2 ± 3.4 | 51.2 ± 4.5 | 122.6 ± 3.4 | 32.1 ± 5.3 | 82.2 ± 5.4 | <10 |
| Example 1 | 162.4 ± 1.5 | 160.8 ± 1.6 | 161.5 ± 2.7 | 159.7 ± 0.8 | 161.7 ± 3.4 | 158.7 ± 2.7 |
| Example 10 | 162.6 ± 0.8 | 146.1 ± 1.5 | 163.9 ± 4.4 | 139.2 ± 0.1 | 161.3 ± 5.2 | 139.5 ± 4.8 |

FIGS. 13 to 15 are photographs of experiment results of measuring thermal stability, in which the top two photographs of FIG. 13 relate to the Comparative Example 9 and the bottom two photographs relate to the Comparative Example 10. The above two photographs of FIG. 14 relate to Comparative Example 11 and the bottom two photographs relate to the Comparative Example 12. The above two photographs of FIG. 15 relate to the Example 1 and the bottom two photographs relate to the Example 10.

Referring to FIGS. 13 to 15 and the above Table 12, the thermal stability of the Comparative Examples in which the existing repellent coating is performed and the thermal stability of the Example in which the rare-earth coating is performed were performed. FIG. 13 illustrates the thermal stability experimental results for the Comparative Examples (the above two drawings) and 10 (the bottom two drawings), in which the copper (Comparative Example 9) and aluminum (Comparative Example 10) samples do not have the coating layer unlike other samples, and therefore a result of reducing the contact angle of the surface appeared over time. Unlike this, in the case of the Comparative Example 11 and 12 and the Examples 1 and 10 manufactured by the existing repellent coating method, all the condensation behaviors in a dropwise form appear initially but the repellent surface is changed to a filmwise form while the behavior gradually collapses and thus a result of reducing the contact angle appeared after 24 hours lapse. However, in the case of the Examples 1 and 10, it was confirmed that the condensation behavior in the dropwise form is still maintained even after 24 hours lapse.

For more quantitative confirmation, the contact angle of the sample before/after the thermal stability experiment was measured as the above Table 12. Unlike the Examples 1 and 10 in which the contact angle before/after the experiment is maintained to some extent, the Comparative Examples 11 and 12 confirmed that the contact angle is remarkably reduced after the experiment. It is determined that the repellent coating of the existing repellent surface disappears compared to the rare-earth that well withstands the high temperature environment and it is determined that roughness of the sample itself is also reduced on the basis of the result of reducing the contact angle of the copper and aluminum samples.

Experimental Example 7

Measurement of Change in Contact Angle Due to Difference in Form

TABLE 13

| | |
|---|---|
| Comparative Example 13 | It was manufactured in a pellet form by compressing ceria powder in a cylindrical steel press frame at 270 MPa for 3 minutes and then compressing it at 350 MPa for 5 minutes, and sintering it at 1560° C. for four hours. |
| Comparative Example 14 | It was manufactured by depositing a thin (~200 to 350 nm) rare-earth layer using a sputtering scheme. |
| Comparative Example 15 | It was manufactured by dipping the heat transfer tube made of copper in the solution having 4 wt % of $Ce(NO_3)_3$, 0.2 vol % of $H_2O_2$, 0.2 mM of NaCl, and HNO3 (pH = 3.5). |

FIGS. 16 to 20 are the comparison photographs for measuring the change in contact angle due to the difference in form. FIG. 16 relates to the Comparative Example 13, FIG. 17 relates to the Comparative Example 14, FIG. 18 relates to the Comparative Example 15, FIG. 19 relates to the Example 1, and FIG. 20 relates to the Example 10.

Referring to FIG. 16, it may confirm that the Comparative Example 13 has very low roughness. There is a limitation in that the contact angle may not be increased up to about 102° due to the roughness. Further, as shown in the above Comparative Example 14 of FIG. 17, even when it is manufactured by a sputter, the roughness is reduced, and thus the textured structure is manufactured and then the contact angle of the superhydrophobic water to be coated may be increased to about 160°. Referring to the Comparative Example 15 of FIG. 18, it may be appreciated that high roughness may be formed only by the dipping scheme. However, the Comparative Example 15 generates a huge number of cracks are and thus when being applied to the heat transfer tube for the actual condenser and heat exchanger, may cause the pinning phenomenon. On the other hand, the Examples 1 and 10 may more simply and cheaply manufacture the uniform rare-earth oxide coating layer and has the high contact angle due to the high roughness.

Experimental Example 8

Increase in Thermal Resistance Due to Difference in Coating Thickness

FIGS. 21 to 24 are an SEM photograph and a FIB comparison photograph of the sample due to the difference in the manufacturing method for coating rare-earth oxide. The Comparative Example 13 of FIG. 21 may confirm that the coating thickness is thick as 2 mm. The Comparative Example 16 of FIG. 22 is manufactured in the pellet form like the Comparative Example 13 and then additionally perform irradiation and may confirm as having the coating thickness similar to the above Comparative Example 13. The thick thickness causes the increase in thermal resistance when it is applied to the actual heat transfer tube for the condenser and the heat exchanger, thereby causing the loss in the heat transfer.

On the other hand, referring to the Example 1 of FIG. 23 and the Example 10 of FIG. 24, it may be confirmed that the average coating thickness is very thin as 200 nm and the difference in the coating thickness of about 10,000 times shows the difference in about 80 times in the theoretical condensation heat transfer performance.

According to the heat transfer tube having rare-earth oxide deposited on the surface thereof and the method for manufacturing the same of the present disclosure, the rare-earth oxide can be deposited on the surface of the heat transfer tube to implement the superhydrophobic surface even under the high temperature environment and the plurality of assembled heat transfer tubes can be coated by coating the complex shape by depositing rare-earth oxide using the method for dipping a surface of the heat transfer tube and coating the same, thereby reducing or preventing the heat transfer tubes from being damaged during the assembling of the heat transfer tubes after the coating.

Hereinabove, preferred exemplary embodiments of the present disclosure are described for illustrative purpose, and the scope of the present disclosure is not limited to the above described specific exemplary embodiment. It will be apparent to those skilled in the art that various variations and modifications may be made without departing from the spirit and scope of the disclosure as defined in the following claims.

What is claimed is:

1. A method for manufacturing a heat transfer tube having a rare-earth oxide superhydrophobic surface, comprising:
    preparing a rare-earth coating solution including $Ce(NO_3)_3$, peroxide, and water;
    sonicating the heat transfer tube;
    dipping the sonicated heat transfer tube into an acidic solution; and
    dipping the heat transfer unit into the rare-earth coating solution to form a coating layer on a surface of the heat transfer tube,
    wherein the coating layer includes a rare-earth oxide.

2. The method of claim 1, wherein the preparing of the rare-earth coating solution includes:
    preparing a mixture by mixing the $Ce(NO_3)_3$, the peroxide, and the water;
    sonicating the mixture;
    agitating the mixture at least 500 rpm for 10 to 30 minutes after the sonicating of the mixture; and
    stabilizing the mixture for 50 to 70 minutes after the agitating.

3. The method of claim 1, further comprising performing a hydrocarbon contamination after the dipping the heat transfer unit.

4. The method of claim 3, wherein the performing includes:
    providing an airtight container including alkene of $C_{10\text{-}20}$ or unsaturated fatty acid solution,
    disposing the heat transfer tube dipped into the rare-earth coating solution in the airtight container, and
    heating the airtight container to 40 to 60° C. for 6 hours or more.

5. The method of claim 3, wherein the coating layer formed on the surface of the heat transfer tube includes a carbon coating layer.

6. The method of claim 1, wherein the rare-earth oxide coating solution includes 4 to 9 wt % of Ce(NO3)3, 1.3 to 2 wt % of peroxide, and a balance of water.

7. The method of claim 1, wherein the sonicating includes disposing the heat transfer tube in acetone and sonicating the heat transfer tube for 3 to 7 minutes, and thereafter disposing the heat transfer tube in ethanol and sonicating the heat transfer tube for 3 to 7 minutes.

8. The method of claim 1, wherein the heat transfer tube includes a plurality of assembled heat transfer tubes.

9. The method of claim 1, wherein the acidic solution includes 2M of hydrochloric acid (HCl).

10. The method of claim 1, wherein in the dipping includes dipping the transfer tube in 2M of hydrochloric acid (HCl) for 20 to 40 seconds.

11. The method of claim 1, wherein the dipping removes a metal oxide layer formed on the surface of the heat transfer tube.

12. The method of claim 1, wherein the heat transfer tube includes copper or aluminum.

13. The method of claim 12, wherein the heat transfer tube includes copper, and the heat transfer tube is dipped into the rare-earth coating solution for 20 to 40 minutes.

14. The method of claim 12, wherein the heat transfer tube includes aluminum, and the heat transfer tube is dipped into the rare-earth coating solution for 30 to 120 minutes.

15. The method of claim 1, wherein the rare-earth oxide of the coating layer includes CeO2.

16. The method of claim 1, wherein a thickness of the coating layer is in the range of 100 to 400 nm.

* * * * *